United States Patent [19]

Simi

[11] Patent Number: 4,873,509
[45] Date of Patent: Oct. 10, 1989

[54] VEHICLE POSITION INDICATOR

[76] Inventor: David G. Simi, 3585 Waterfall Dr., Sparks, Nev. 89431

[21] Appl. No.: 113,019

[22] Filed: Oct. 27, 1987

[51] Int. Cl.$^4$ .............................................. B60Q 1/00
[52] U.S. Cl. .................................... 340/436; 340/988; 200/61.41; 180/274
[58] Field of Search ............... 340/988, 51, 61, 825.49, 340/686, 665; 200/DIG. 10, 61.41, 61.42, 61.43, 61.44; 180/274; 116/28 A

[56] References Cited

U.S. PATENT DOCUMENTS

| | | | |
|---|---|---|---|
| 3,018,344 | 1/1962 | Vinci | 340/61 |
| 3,820,065 | 6/1974 | Koplewicz et al. | 340/51 |
| 3,922,638 | 11/1975 | Mendelsohn | 340/51 |
| 4,237,446 | 12/1980 | Roberts | 340/61 |

Primary Examiner—Donnie L. Crosland
Attorney, Agent, or Firm—Leon Gilden

[57] ABSTRACT

A vehicle position indicator apparatus is positionable to detect a forwardmost position of a vehicle to provide an audible alarm for such position. An elongate antennae is contactable by the forwardmost portion of a vehicle whereupon a circuit will be completed and the aforenoted audible alarm will sound. The indicator apparatus includes a self-contained power supply and is accordingly positionable as desired.

1 Claim, 1 Drawing Sheet

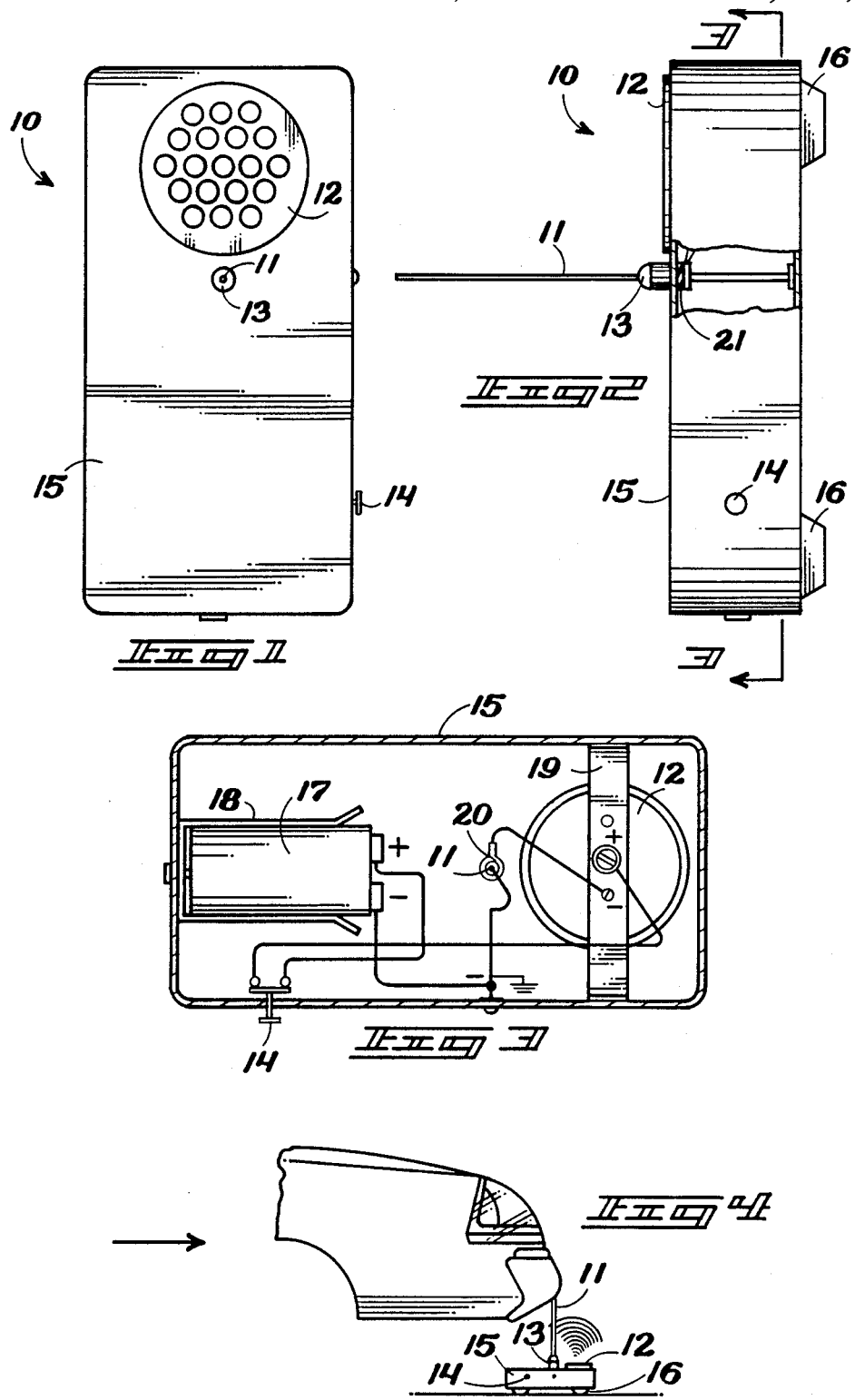

VEHICLE POSITION INDICATOR

BACKGROUND OF THE INVENTION

1. Field of the Invention

The present invention relates to detection apparatus, and more particularly pertains to a new and improved detection apparatus which includes the characteristics of mobility and effectiveness in a compact size for transport and orientation of same.

2. Description of the Prior Art

The use of detection apparatus is well known in the prior art. As may be appreciated, these devices have normally been of elaborate and bulky structure wherein the storage and mobility of such devices have been rather limited when not being utilized. In this connection, there have been several attempts to develop vehicle positioning devices which may be easily and efficiently positioned and oriented as needed. For example, U.S. Pat. No. 3,493,925 to Brancale utilizes a pressure pad mounted on a forwardmost portion of a garage-like structure that upon contact with a forwardmost portion of a vehicle will actuate a light for indicating the appropriate position of said vehicle. The Brancale system is unfortunately limited in maneuverability and becomes a permanent part of the structure. Furthermore, the orientation with respect to a rearwardmost portion of a garage wall provides very little margin of error for positioning of an oncoming vehicle.

U.S. Pat. No. 3,817,203 to Brauer utilizes a reciprocatable ball operable in conjunction with a lowering and raising of a garage door for mechanical positioning and contact of a vehicle to orient same. As in other prior art devices, the apparatus is permanently affixed to the parking garage and is therefore of limited value in positioning cars and limited in response to varying the desired position of a vehicle within said garage as opposed to the instant invention. Brauer sets forth a further patent in No. 3,874,322 wherein the invention provides a somewhat modification of the earlier patent by including a spring retraction device in cooperation with the positioning ball but is essentially of the same format and construction of the earlier patent.

U.S. Pat. No. 4,036,165 to Wood utilizes a spring-loaded hammer that upon contact by a vehicle effects an audible response for indicating vehicle positioning. The device is permanently secured to the associated garage and is of a rather awkward structure that requires recocking and setting each time its use is desired.

U.S. Pat. No. 4,313,104 to Phillips utilizes a vehicular mounted fender guide for automotive positioning and its permanent securement to the vehicle is aesthetically and mechanically undesirable due to its creating an adjunct to a vehicle and acceptance accordingly is somewhat limited by the public.

U.S. Pat. No. 4,433,636 to Crouch utilizes a portable indicating device for use within a garage-type area wherein a mechanically mounted ball may be contacted by a forwardmost portion of a vehicle for indicating mechanical positioning of said vehicle. The rather expansive organization of the patent is, as other prior devices, limiting in its acceptance and use by the general public.

As such, it may be appreciated that there is a continuing need for a new and improved vehicle positioning indicator which addresses both the problem of compactness and portability, and in this respect the present invention substantially fulfills this need.

SUMMARY OF THE INVENTION

In view of the foregoing disadvantages inherent in the known types of vehicle positioning indicators now present in the prior art, the present invention provides a vehicle position indicator which may be compactly stored when not in use and may be further easily and efficiently positioned for use as needed. As such, the general purpose of the present invention, which will be described subsequently in greater detail, is to provide a new and improved vehicle position indicator which has all the advantages of the prior art vehicle position indicator apparatus and none of the disadvantages.

To attain this, the present invention uses a self-contained module containing a battery supply wherein an elongate antennae-like element is contactable by a forwardmost portion of a vehicle which completes a circuit within the interior of the module and actuate an audible alarm.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle position indicator which has all the advantages of the prior art vehicle position indicators and none of the disadvantages.

It is another object of the present invention to provide a new and improved vehicle position indicator which may be easily and efficiently manufactured and marketed.

It is a further object of the present invention to provide a new and improved vehicle position indicator which is of a durable and reliable construction.

An even further object of the present invention is to provide a new and improved vehicle position indicator which is susceptible of a low cost of manufacture with regard to both materials and labor, and which accordingly is then susceptible of low prices of sale to the consuming public, thereby making such vehicle position indicator economically available to the buying public.

Still yet another object of the present invention is to provide a new and improved vehicle position indicator which provides in the apparatuses and methods of the prior art some of the advantages thereof, while simultaneously overcoming some of the disadvantages normally associated therewith.

Still another object of the present invention is to provide a new and improved vehicle position indicator apparatus wherein an elongate antennae is contactable to complete a circuit to energize an associated audible alarms.

Even still another object of the present invention is to provide a new and improved vehicle indicator apparatus including a self-contained power supply enabling mobility and portability of the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top orthographic view of the instant invention.

FIG. 2 is a side orthographic view of the instant invention of FIG. 1.

FIG. 3 is a top orthographic view of the instant invention taken along the lines 3—3 of FIG. 2 in the direction indicated by the arrows.

FIG. 4 is an orthographic side view of the instant invention illustrating positioning of the device in association with a vehicle for positioning thereof.

DESCRIPTION OF THE PREFERRED EMBODIMENT

With reference now to the drawings, and in particular to FIG. 1 thereof, a new and improved vehicle position indicator embodying the principles and concepts of the present invention and generally designated by the reference numeral 10 will be described.

To attain this, the present invention comprises a conventional case-like portion 15 housing the various components to be described. A contact antennae 11 orthogonally emanates from within the case 15's interior to a position remote from the upper surface of case 15 to enable contact with a leading portion of a vehicle. Normally, a range of 12 to 16 inches will be adequate but may be modified dependent upon needs and the height of a particular vehicle. Antennae 11 is normally formed of an electrically conductive material, such as steel or the like, and is formed to be of memory retentent elasticity to return to an original orientation once deflected by a vehicle. Positioned for effectiveness is an audible speaker 12 supported by bracketing, and as indicated in FIG. 1, a switch element 14 is conveniently positioned for on/off activation of the device.

With reference to FIG. 3, contact antennae 11 projects downwardly through the upper surface of case 15 and is secured to the floor of said case. Positioned somewhat proximate the upper surface of case 15 is a contact ring switch 20 of any convenient construction but preferably positioned and configured to enable contact about 360 degrees of motion of contact antennae 11. Contact ring switch 20 insulated from case 15 by insulator 21 is wired in series with battery 17 supported within a support 18 whereupon contact antennae 11 being deflected by a vehicle and engaging switch 20, the circuit of DC wiring organization will be completed energizing speaker 12 to effect the appropriate position of an associated vehicle "C". Switch 14 may be of any convenient push/pull construction enabling an ease to activate or deactivate the apparatus, as desired.

Furthermore, a contact antennae may be of a telescoping construction to enable accommodation of a variety of various bumper heights of automobiles and will utilize a rubber cover boot 13 in association with the upper surface of said case 15 to eliminate any potential of sparks upon contact of 11 with ring switch 20. Rubber-like friction feet 16 secured to case 15 upon its lowermost surface supports said case and resists movement of said case when an automobile contacts the antennae 11.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle position indicator apparatus to provide an audible signal upon a predetermined positioning of a vehicle with respect to said apparatus wherein said apparatus comprises, a box-like case means including side walls, a top wall and a bottom wall, and a contact antennae means secured within said case means and projecting vertically upwardly and outwardly of said top wall of said case a predetermined distance for engagement with said vehicle, and a speaker means positioned in said case for emitting an audible sound upon said contact antennae completing an electrical circuit, and switch means positioned proximate said antennae within said case to complete said circuit upon deflection of said antennae by said vehicle, and wherein an on/off switch means positioned through one of said side walls of said case means enables selective completion of said circuit upon contact of said antennae with said switch means, and wherein a DC battery is positioned within said case means for providing energy to said electrical circuit, and wherein said switch means comprises a 360 degree encircling ring about said antennae for enabling contact of said antennae with said switch means, and wherein a rubber-like cover boot portion formed about said antennae means externally of said case means and in contact with said case means for containing sparking effected by completion of said circuit within said case means, and wherein friction-like feet are positioned downwardly from said bottom wall and externally of said case means to maintain said positioning of said apparatus on a horizontal support surface.

* * * * *